United States Patent Office 3,278,525
Patented Oct. 11, 1966

3,278,525
AMINOARYLDISULFONIC ACID SALTS OF
α-AMINOARYLMETHYLPENICILLINS
David A. Johnson, Fayetteville, and Herbert H. Silvestri, Dewitt, N.Y., assignors to Bristol-Myers Company, New York, N.Y., a corporation of Delaware
No Drawing. Filed June 8, 1964, Ser. No. 373,561
9 Claims. (Cl. 260—239.1)

This invention relates to new synthetic compounds of value as antibacterial agents, as nutritional supplements in animal feeds, as agents for the treatment of mastitis in cattle, as therapeutic agents in poultry and animals, including man, in the treatment especially of infectious diseases caused by Gram-positive and Gram-negative bacteria, and more particularly, this invention relates to adducts of an α-aminophenyl- (or thienyl)-methylpenicillin or an α-amino-substituted phenyl- (or substituted thienyl)-methylpenicillin with an aminoaryldisulfonic acid. This invention further relates to processes for the isolation of α-aminophenyl- (or thienyl)-methylpenicillin and α-amino-substituted phenyl- (or substituted thienyl)-methylpenicillin from impure reaction mixtures containing such penicillins by the use of such adducts.

Antibacterial agents such as benzylpenicillin have proved highly effective in the past in the therapy of infections due to Gram-positive bacteria, but such agents suffer from the serious drawbacks of being ineffective against numerous strains of bacteria, e.g., most Gram-negative bacteria. The compounds of the present invention are particularly useful in that they possess potent antibacterial activity against both Gram-positive and Gram-negative bacteria upon either parenteral or oral administration and also exhibit resistance to destruction by acid.

α-Aminobenzylpenicillin, α-amino-substituted - benzylpenicillins, α-aminothienylmethylpenicillin and α-amino-substituted-thienylmethylpenicillins are known in the technical literature, having been described, for example, in United States Patent No. 2,985,648 and Belgian Patent No. 631,631, the disclosures of which are incorporated herein by reference. According to the teachings of said patents, the penicillins are prepared by the reaction of 6-aminopenicillanic acid with an acylating agent such as the acid chloride, acid bromide, acid anhydride, mixed anhydride, etc., of a derivative of α-aminophenyl- (or substituted phenyl)-acetic acid or α-aminothienyl- (or substituted thienyl)-acetic acid in which the amino group is protected by a carbobenzoxy or other suitable protecting group. After completion of the acylation reaction, the protecting group is removed from the amino group such as by reaction with hydrogen in the presence of a catalyst.

As used herein, the terms "an (or the') α-aminobenzylpenicillin" and "an (or 'the') α-aminothienylmethylpenicillin" are intended to include α-amino-substituted-benzylpenicillins and α-amino-substituted-thienylpenicillins as well as α-aminobenzylpenicillin and α-aminothienylmethylpenicillin per se. Similarly, such terms as "an (or 'the') α-aminophenylacetic acid" and "an (or 'the') α-aminothienylacetic acid" are intended to include α-amino-substituted phenylacetic acids and α-amino-substituted thienylacetic acids as well as α-aminophenylacetic acid and α-aminothienylacetic acid per se.

The known methods for the preparation of the α-aminobenzylpenicillins and the α-aminothienylmethylpenicillins by the acylation of 6-aminopenicillanic acid result in the preparation of mixtures which contain, in addition to the desired penicillin, unreacted 6-aminopenicillanic acid, hydrolyzed acylating agent, and products of side reactions such as the products of the acylating agent reacted with itself and/or with the desired penicillin. Because these compounds may have similar solubility characteristics in various media, it is often difficult to isolate the desired penicillin from the other reaction products.

Accordingly, it is an object of this invention to provide an improved process for the recovery of an α-aminobenzylpenicillin or an α-aminothienylmethylpenicillin from its mixture with other reaction products obtained by the acylation of 6-aminopenicillanic acid with an acylating derivative of an α-aminophenylacetic or an α-aminothienylacetic acid. It is a further object of this invention to provide new water-insoluble derivatives of said penicillins.

These objects have been achieved by the provision, according to the present invention, of a member selected from the group consisting of compounds of the general formula (I)

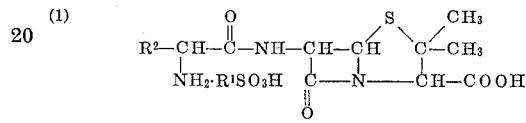

wherein $R^1$ is a member selected from the group consisting of (II)

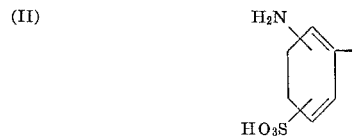

and (III)

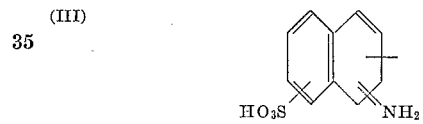

and wherein $R^2$ is a member selected from the group consisting of (IV)

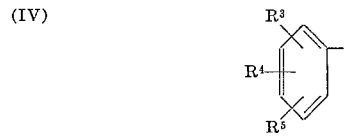

and (V)

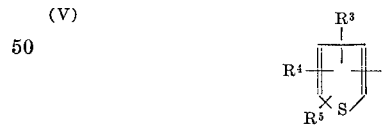

wherein $R^3$, $R^4$ and $R^5$ each represents a member selected from the group consisting of hydrogen, nitro, di-(lower)alkylamino, (lower)alkanoylamino, (loweralkanoyloxy, (lower)alkyl (including straight and branched chain saturated aliphatic groups having from 1 to 6 carbon atoms inclusive), (loweralkoxy, sulfamyl, chloro, iodo, bromo, fluoro, trifluoromethyl, (lower)alkylthio, (lower)alkylsulfonyl, carbo(lower)alkoxy, benzyl, phenethyl, cycloheptyl, cyclohexyl and cyclopentyl; as well as easily hydrolyzed esters or amides which may be converted to the free acid form by chemical or enzymatic hydrolysis. Also included within the scope of this invention are the hydrates of the compounds of Formula I as well as the anhydrous compounds.

Preferred compounds of the present invention are the 1:1 molar adduct of (—)-α-amino-2-thienylmethylpenicillin and 7-amino-1,3-naphthalenedisulfonic acid, the 1:1 molar adduct of (—)-α-amino-2-thienylmethylpenicillin and 6-amino-1,3-naphthalenedisulfonic acid, the 1:1 molar adduct of (—)-α-aminobenzylpenicillin and 7-amino-1,3-naphthalenedisulfonic acid and the 1:1 molar adduct of (—)-α-aminobenzylpenicillin and 6-amino-1,3-napthalenedisulfonic acid.

The process of this invention, briefly, comprises providing an aqueous solution containing a penicillin selected from the group consisting of compounds having the formula (VI) 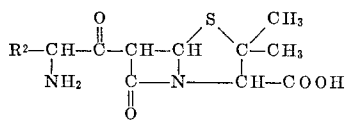

wherein R² is as described above, and salts thereof; contacting said aqueous solution with a water-soluble aminoaryldisulfonic acid selected from the group consisting of (VII) 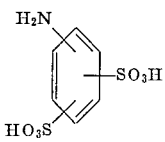

and (VIII) 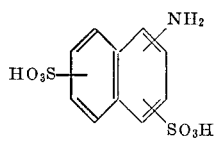

and salts thereof; adjusting the pH of the reaction mixture to within the range of about 1.0 to 4.0 whereby a solid reaction product of said penicillin and said aminoaryldisulfonic acid is formed; and recovering said solid reaction product.

Salts of the aminoaryldisulfonic acid which are suitable for use in the process of this invention include the ammonium, substituted ammonium, alkali metal and alkaline earth metal salts.

As may be seen from the examples, the adducts prepared by the process of the present invention are invariably the 1:1 molar adduct of the particular penicillin and aminoaryldisulfonic acid. This is believed to be due to the formation of an "inner salt" within the aminoaryldisulfonic acid, i.e., between the amino group and one of the sulfo groups, thereby resulting in a configuration having only one sulfo group available for reaction with the α-amino group of the penicillin. It should be understood, however, that the above-mentioned mechanism is offered only in an attempt to provide an explanation for this novel reaction, and the present invention is in no way limited thereto.

The α-carbon atom of the acyl group (to which the amino group is attached) is an asymmetric carbon atom, and the compounds of this invention can therefore exist in two optically active isomeric forms (the D- and L-diastereoisomers), as well as in a mixture of the two optically active forms; all such isomeric forms of the compounds are included within the scope of the present invention.

It should be noted in connection with the foregoing consideration of the diastereoisomers of this invention that many isomers other than the two caused by the asymmetric carbon of the side chain are possible due to the presence of asymmetric carbon atoms in the 6-aminopenicillanic acid nucleus. Such additional isomers, however, are not presently significant, since 6-aminopenicillanic acid which is the product of fermentation processes is consistently of one configuration, and such 6-aminopenicillanic acid is presently used in the production of the compounds of this invention.

As used herein, such terms as (—)-α-aminobenzylpenicillin and (—)-α-aminothienylmethylpenicillin do not refer to the rotation of the penicillin molecule in its entirety [which is quite generally (+)], but rather to the (—) rotation of the derivative of α-aminophenylacetic acid or α-aminothienylacetic acid from which the penicillin was prepared, i.e., it refers to the configuration of the aforementioned asymmetric α-carbon atom of the acyl group of said penicillins. Similarly the term (+)-α-aminobenzylpenicillin and (+)-α-aminothienylmethylpenicillin refer to the (+) rotation of said asymmetric α-carbon atom. If no sign is specifically indicated, the DL-mixtuer is intended.

The aqueous solution containing an α-aminobenzylpenicillin or an α-aminothienylmethylpenicillin as defined in Formula VI above may be obtained by dissolving the appropriate crystalline penicillin in water. However, the maximum advantages of this invention are attained by using an impure solution containing an α-aminobenzylpenicillin or an α-aminothienylmethylpenicillin. Typically, the aqueous solution containing the penicillin is obtained by the acylation of 6-aminopenicillanic acid with an appropriate acylating agent, such as described in United States Patent No. 2,985,648 and Belgian Patent No. 631,-631. This reaction mixture may contain, in addition to the desired α-aminobenzylpenicillin or α-aminothienylmethylpenicillin, unreacted 6-aminopenicillanic acid and hydrolysis or side reaction products of the acylating agents. Numerous other side-reaction products are also frequently present as impurities. The solution containing the α-aminobenzylpenicilin or α-aminothienylmethylpenicillin may also be the mother liquor remaining after the recrystallization of the corresponding penicillin.

It is preferred that the solution contain from 25 to 100 mg. of the desired penicillin per ml. of solution. If necessary, the solution may be concentrated by placing the solution under a partial vacuum at a temperature of from 30–40° C. for several minutes.

If the aqueous solution containing the α-aminobenzylpenicillin or α-aminothienylmethylpenicillin also contains organic impurities such as in the reaction mixture obtained by acylating 6-aminopenicillanic acid, a water-immiscible organic solvent, preferably methyl isobutyl ketone, is added to the solution. Other solvents which may be used include other (lower)ketones, (lower)aliphatic esters such as butyl acetate, halogenated (lower)hydrocarbons such as methylene chloride, aromatic hydrocarbons such as toluene and mixtures thereof with each other or with methyl isobutyl ketone. Generally, any water-immiscible solvent may be used. The presence of the solvent facilitates crystallization and results in a purer product. The volume ratio of the organic solvent to the aqueous phase is not critical. Thus, for every volume of water present, there may also be present as much as two volumes or more of the organic solvent or less than 1/10 volume of the organic solvent.

Preferred aminoaryldisulfonic acids which may be used in accordance with the practice of this invention include the isomeric aminobenzenedisulfonic acids, such as 2-amino-1,4-benzene-disulfonic acid, and the isomeric aminonaphthalenedisulfonic acids such as 7-amino-1,3-naphthalenedisulfonic acid, 6 - amino-1,3-naphthalenedisulfonic acid , 3-amino-1,5-naphthalenedisulfonic acid, 8-amino-1,5-naphthalenedisulfonic acid, 3-amino-2,7-naphthalenedisulfonic acid and 2-amino-1,5-naphthalenedisulfonic acid. The aminoaryldisulfonic acids which may be used are described in the prior art and many of them are commercially available. It is preferred to use a concentrated aqueous solution of the free acid although the water-soluble ammonium or substituted ammonium, alkali metal and alkaline earth metal salts of these acids may also be used. Preferably, from about 1 to about 2 moles of the aminoaryldisulfonic acid are used per mole of the α-aminobenzylpenicillin or α-aminothienylmethylpenicillin in the solution.

The aminoaryldisulfonic acid is generally contacted with the aqueous solution containing the penicillin at low temperatures, i.e., at temperatures between about 0–10° C., in order to minimize decomposition of the product and losses of the solution as well as to hasten the crystallization of the product. The pH of the solution during the formation of the aminoaryldisulfonic acid adduct of the α-aminobenzylpenicillin or α-aminothienylmethylpenicillin should be within the range of from about 1.0–4.0. The pH of the solution may be higher than 4.0, for example about 4.5, during the addition of the aryl sulfonic acid, but the desired salt will not form until the pH is within the range of from about 1.0 to 4.0; the preferred pH range is 1.5 to 2.0. If the pH is not brought to within the range of from about 1.0 to 4.0 by the addition of the aminoaryldisulfonic acid, mineral acid such as HCl or $H_2SO_4$ may be added to adjust the pH.

Crystallization of the aminoaryldisulfonic acid adduct of the α-aminobenzylpenicillin or α-aminothienylmethylpenicillin may be initiated, if necessary, by seeding. After precipitation of the product is completed, it is recovered by any suitable means, such as by filtration. The product may then be washed with water and/or an organic solvent such as methyl isobutyl ketone and subsequently dried.

When the aminoaryldisulfonic acid adduct of the particular α-aminobenzylpenicillin or α-aminothienylmethylpenicillin is obtained in a hydrated form, it may readily be converted to the anhydrous form. This may be accomplished by slurrying the hydrate in a large volume of dry acetone, e.g. about 10 ml. of acetone per gram of hydrate. The amount of the acetone used should be such that there will be less than 2% by weight of water in the acetone slurry after the hydrate (which may be wet to begin with) is slurried in the acetone. The slurry is then stirred for about three hours at about 25 to 30° C., filtered, the filter cake washed with about five volumes of dry acetone and dried at about 50° C.

Since the aminoaryldisulfonic acid salts of an α-aminobenzylpenicillin or α-aminothienylmethylpenicillin produced in accordance with the practice of this invention possesses valuable antibacterial properties, they may be used directly as therapeutic agents. They possess about the same activity against both Gram-positive and Gram-negative bacterial upon either parenteral or oral administration as do the corresponding penicillins. In their anhydrous form, these compounds are soluble in methanol, ethanol, formamide, dimethyl formamide and pyridine and are insoluble in other common solvents. Moreover, they are valuable intermediates for the production of the corresponding pure α-aminobenzylpenicillin or α-aminothienylmethylpenicillin.

The adduct of an α-aminobenzylpenicillin or an α-aminothienylmethylpenicillin with an aminoaryldisulfonic acid, as produced by the process of this invention, may be converted to the corresponding α-aminobenzylpenicillin or α-aminothienylmethylpenicillin by neutralization, such as by suspending the adduct in water and adjusting the pH of the suspension to about 6.0–8.0 and preferably about 6.7–7.2. The adjustment of the pH of the solution is preferably accomplished by the addition of a tertiary amine, such as triethylamine, preferably at about room temperature. Other alkaline materials, such as sodium hydroxide, ammonium hydroxide, potassium hydroxide, sodium carbonate, ammonium carbonate, potassium carbonate, etc., may also be used. The adjustment of the pH cause precipitation of the corresponding penicillin trihydrate to commence. The pH of the solution is then adjusted to about 4.5 to 4.6 by the addition of an acid such as HCl and cooled to complete precipitation. After precipitation of the penicillin trihydrate is completed, it may be recovered by filtration. The product may then be washed with water and/or an organic solvent such as methyl isobutyl ketone and dried.

A preferred and particularly elegant procedure for the recovery of the penicillin from its adduct with an aminoaryldisulfonic acid is the process of containing said adduct with an amine or a mixture of amines, of the general formula (IX) 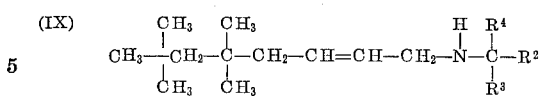

wherein each of $R^2$, $R^3$ and $R^4$ is an aliphatic hydrocarbon radical and wherein $R^2$, $R^3$ and $R^4$ contain in the aggregate from 11 to 14 carbon atoms, in a water-immiscible organic solvent, whereupon the amphoteric penicillin precipitates and may be recovered, as by filtration. It is preferred that the penicillin be isolated in the form of its trihydrate, and the aminesolvent media should therefore contain at least three moles of water per mole of penicillin. In order to obtain the penicillin trihydrate, it is essential to contact the penicillinaminoaryldisulfonic acid adduct with the amine at a temperature below about 60° C. The preferred temperature range is from about 0° to 35° C. If temperatures in excess of about 60° C. are employed, the anhydrous penicillin is formed.

The class of amines described above are liquids, and these amines, or mixtures thereof, are added to the solution in their free base form. The amount of such amines which is used will generally vary from about 68 to 250 percent by weight, and preferably from 85 to 150 percent by weight of the penicillin-aminoaryldisulfonic acid adduct. While greater amounts of amine may be used, no significant advantage is obtained by using more than about 250 percent by weight of the penicillin-aminoaryldisulfonic acid adduct.

Amines of Formula IX above are commercially available. One such mixture of secondary amines, wherein each secondary amine has the structure of Formula IX, is sometimes referred to as "Liquid Amine Mixture No. I" and is a clear amber liquid having the following physical characteristics: viscosity at 25° C. of 70 cps.; specific gravity at 20° C. of 0.845; refractive index at 25° C. of 1.467; distillation range at 10 mm.: up to 160° C.—4%, 160 to 210° C.—5%, 210 to 220° C.—74%, above 220° C.—17%.

The water-immiscible organic solvent in which the penicillin-aminoaryldisulfonic acid adduct is contacted with the amine is preferably methyl isobutyl ketone. Other solvents which can be used include other (lower) alkyl ketones (lower) alkyl esters such as butyl acetate, halogenated (lower) hydrocarbons such as chloroform or methylene dichloride, aromatic hydrocarbons such as toluene; (lower)alky ethers such as diamyl ether; water immiscible (lower) alkanols; and mixtures thereof with each other or with methyl isobutyl ketone. The amount of solvent used is not critical and large amounts of the solvent can be used, since the resulting penicillin trihydrates are not soluble in these materials. Since the penicillin trihydrates are also relatively insoluble in water, a considerable amount of water can be present in the system without reducing the yield of the desired product to any great extent.

By the practice of the process of this invention, much higher yields of α-aminobenzylpenicillins and α-aminothienylmethylpenicillins may be obtained from the reaction mixtures in which these penicillins have been prepared by the acylation of 6-aminopenicillanic acid than has heretofore been possible in a large-scale operation. Moreover, the α-aminobenzylpenicillins and α-aminothienylmethylpenicillins are obtained in a higher state of purity than by previous processes.

The Minimum Inhibitory Concentration (MIC) against various microorganisms was determined for adducts prepared by the process of this invention. The results, along with the corresponding MIC's for (—)-α-aminobenzylpenicillin itself, are shown in Table 1.

The following examples illustrate the best modes contemplated for carrying out this invention and are given only for purposes of illustration and not of limitation.

TABLE I
[Minimum Inhibitory Concentrations (mcg./ml.)]

| Organism | Medium | Adduct A | Adduct B | Adduct C | Adduct D | (−)-α-Amino-Benzyl-penicillin |
|---|---|---|---|---|---|---|
| Diplococcus pneumoniae | HIB [1] | 0.016 | 0.012 | 0.016 | 0.024 | 0.008 |
| Streptococcus pyogenes | HIB | 0.016 | 0.012 | 0.012 | 0.008 | 0.010 |
| Staphylococcus aureus Smith | HIB | 0.062 | 0.062 | 0.062 | 0.047 | 0.031 |
| Staphylococcus aureus Smith | HIB [2] | 0.062 | 0.062 | 0.062 | 0.062 | 0.031 |
| Escherichia coli ATCC 8739 | HIB | 38 | 19 | 25 | 25 | 9.7 |
| Salmonella enteritidis | HIB | 0.25 | 0.25 | 0.25 | 0.25 | 0.13 |
| Salmonella typhosa | HIB | 4.7 | 1.6 | 1.6 | 4.7 | 1.6 |
| Klebsiella pneumoniae | HIB | 6.3 | 1.6 | 2.4 | 6.3 | 1.6 |
| Mycobacterium smegmatis No. 607 | HIB | >100 | >100 | >100 | >100 | >100 |
| Pseudomonus aeruginosa | HIB | >100 | >100 | >100 | >100 | >100 |

[1] 5% pooled human serum added.
[2] 50% pooled human serum added.
HIB = Heart infusion broth.
Adduct A = 1:1 molar adduct of (−)-α-aminobenzylpenicillin and 6-amino-1,3-naphthalenedisulfonic acid.
Adduct B = 1:1 molar adduct of (−)-α-aminobenzylpenicillin and 7-amino-1,3-naphthalenedisulfonic acid.
Adduct C = 1:1 molar adduct of (−)-α-amino-2-thienylmethylpenicillin and 6-amino-1,3-naphthalenedisulfonic acid.
Adduct D = 1:1 molar adduct of (−)-α-amino-2-thienylmethylpenicillin and 7-amino-1,3-naphthalenedisulfonic acid.

EXAMPLE 1

To a rapidly stirred solution of the sodium salt of (−)-α-aminobenzylpenicillin (1.0 gram, 0.0027 mole) in 20 ml. of water at 25° C. there is slowly added 0.94 gram (0.0027 mole) of the disodium salt of 6-amino-1,3-naphthalenedisulfonic acid. The pH is adjusted to 1.7 with hydrochloric acid, whereupon a crystalline solid precipitates. Stirring is continued for an additional thirty minutes, and the mixture is then filtered. The crystalline solid is washed with methyl isobutyl ketone, dried in vacuo over $P_2O_5$ and is found to weigh 0.4 gram. The product, the 1:1 adduct of (−)-α-aminobenzylpenicillin and 6-amino-1,3-naphthalenedisulfonic acid, has an activity of 525 micrograms of (−)-α-aminobenzylpenicillin per milligram.

EXAMPLE 2

*Part A.*—A solution of the sodium salt of (−)-α-aminobenzylpenicillin (3.0 grams, 0.0081 mole) in 60 ml. of ice water is layered with 30 ml. of methyl isobutyl ketone and stirred rapidly while 3.5 grams (0.0112 mole) of solid 6-amino-1,3-naphthalenedisulfonic acid is slowly added. The mixture is acidified to pH 1.7 with hydrochloric acid, and the resulting slurry is cooled in ice, with stirring, for one hour and filtered. The crystalline solid washed with 20 ml. of iced water and with a small portion of methyl isobutyl ketone. After drying in vacuo, the product, the 1:1 adduct of (−)-α-aminobenzylpenicillin and 6-amino-1,3-naphthalenedisulfonic acid, is found to weigh 4.0 grams.

*Part B.*—The product prepared in Part A above, when obtained in a hydrated form, is slurried in 50 ml. of dry acetone and the slurry is stirred for three hours at 25–30° C. and filtered. The filter cake is washed with 20 ml. of dry acetone and dried at 50° C. The product, the anhydrous 1:1 adduct of (−)-α-aminobenzylpenicillin and 6-amino-1,3-naphthalenedisulfonic acid, is very heat stable.

*Part C.*—A portion (2.0 grams) of the product obtained in Part B above is suspended in about 30 ml. of water. The pH of the suspension is adjusted to 7.5 by the addition of triethylamine whereupon a crystalline material begins to separate. The pH of the mixture is then adjusted to about 4.5 by the addition of 6 N HCl. The mixture is allowed to crystallize for about one-half hour and the precipitated crystalline material is collected by filtration and dried. The product is determined by infra-red analysis to be substantially pure (−)-α-aminobenzylpenicillin.

EXAMPLE 3

A solution of 3.0 grams (0.0081 mole) of the sodium salt of (−)-α-aminobenzylpenicillin in 60 ml. of water is layered with 30 ml. of methyl isobutyl ketone and stirred rapidly while 3.5 grams (0.0112 mole) of 7-amino-1,3-naphthalenedisulfonic acid is slowly added. The resulting mixture has a pH of 5.9. Sufficient hydrochloric acid is added to adjust the pH of the mixture to 1.7, whereupon a crystalline solid forms. The resulting slurry is stirred for an additional two hours at 0° C. and filtered. The solid is washed with a small portion of methyl isobutyl ketone, with 20 ml. of iced water which has been adjusted to a pH of 2.0 with hydrochloric acid, and with another small portion of methyl isobutyl ketone. After drying in vacuo over $P_2O_5$ the product, the 1:1 adduct of (−)-α-aminobenzylpenicillin and 7-amino-1,3-naphthalenedisulfonic acid, is found to weigh 4.95 grams.

EXAMPLE 4

6-amino-1,3-naphthalenedisulfonic acid (2.7 grams, 0.0089 mole) is dissolved in a mixture of 10 ml. of water and 40 ml. of acetone. To this solution there is added 2.5 grams (0.0072 mole) of (−)-α-aminobenzylpenicillin, and the resulting solution has a pH of 1.5. Upon the addition of 50 ml. of acetone, fine needle-like crystals slowly precipitate from the solution. The mixture is filtered, and the crystalline solid is dried in vacuo over $P_2O_5$. The product, the 1:1 adduct of (−)-α-aminobenzylpenicillin and 6-amino-1,3-naphthalenedisulfonic acid, is found to weight 3.2 grams.

EXAMPLE 5

α-Aminobenzylpenicillin (5.0 grams, 0.0143 mole) is dissolved in a mixture of 20 ml. of water and 80 ml. of acetone. To this stirred solution, which has a pH of 2.0 there is slowly added a solution of 5.4 grams (0.0178 mole) of 6-amino-1,3-naphthalenedisulfonic acid in 7 ml. of water. The resulting solution has a pH of 1.0. The solution is cooled to 0°C., whereupon a crystalline solid slowly forms. Acetone (100 ml.) is added, and the solution is stirred for another thirty minutes and filtered. The solid product, the 1:1 adduct of α-aminobenzylpenicillin and 6-amino-1,3-naphthalenedisulfonic acid, is washed with acetone, dried in vacuo and found to weigh 5.1 grams.

EXAMPLE 6

To a stirred solution of 5.0 grams (0.0143 mole) of (−)-α-aminobenzylpenicillin in 20 ml. of water and 80 ml. of acetone at 0° C., there is slowly added 4.35 grams (0.0143 mole) of 6-amino-1,3-naphthalenedisulfonic acid. The pH of this solution is found to be 2.1. An additional 0.5 gram portion of 6-amino-1,3-naphthalenedisulfonic acid is added, and the pH drops to 1.75. A third portion of 0.25 gram (for a total of 0.0168 mole) of 6-amino-1,3-naphthalenedisulfonic acid is added, and the pH of the solution is then found to be 1.6. The addition of 15 ml. of acetone causes a heavy precipitation of crystalline solid. Additional small portions of acetone (a total of 100 ml.) are added at intervals over a period of thirty minutes. The resulting slurry is filtered and the product, the 1:1 adduct of α-aminobenzylpenicillin and 6-amino-1,3-naphthalenedisulfonic acid, is dried in vacuo and found to weigh 5.2 grams and to have an activity of 480 micrograms of (—)-α-aminobenzylpenicillin per milligram. A second crop of product is obtained from the mother liquor and is found to weigh 1.29 grams and to have an activity of 415 micrograms (—)-α-aminobenzylpenicillin per milligram.

EXAMPLE 7

*Part A.*—One gram (0.0027 mole) of the sodium salt of (—)-α-aminobenzylpenicillin is dissolved in 20 ml. of water to form a solution having a pH of 9.2. To this solution there is added 0.816 gram (0.0027 mole) of 7-amino-1,3-naphthalenedisulfonic acid to give a clear solution having a pH of 6.8. The pH is adjusted to 4.0 with hydrochloric acid, at which time the solution becomes turbid. The addition of additional hydrochloric acid to a pH of 1.7 causes the formation of a heavy precipitate of crystalline solid. One hundred ml. of water is added and the slurry is stirred for 15 minutes at room temperature and filtered. The solid was washed with small portions of water and methyl isobutyl ketone, dried in vacuo over $P_2O_5$ and found to weigh 0.82 grams. The product, shown by infrared analysis to be a hydrate of the 1:1 adduct of (—)-α-aminobenzylpenicillin and 7-amino-1,3-naphthalenedisulfonic acid has an activity of 510 micrograms of (—)-α-aminobenzylpenicillin per milligram.

*Part B.*—A portion of the product prepared in Part A, above, (2.0 grams) is slurred in 25 ml. of dry acetone, stirred for three hours at 25–50° C. and filtered. The solid is washed with 10 ml. of dry acetone and dried at 50° C. The product, the anhydruos 1:1 adduct of (—)-α-aminobenzylpenicillin and 7-amino - 1,3 - naphthalenedisulfonic acid, is very heat stable.

EXAMPLE 8

An aqueous reaction mixture (500) ml. containing (—)-α-aminobenzylpenicillin which had been formed by the acylation of 6-aminopenicillanic acid is stripped of acetone and methyl isobutyl ketone in vacuo at a temperature below 40° C. The resulting solution has a pH of 2.7. Methyl isobutyl ketone (250 ml.) is added and the mixture is stirred at 0° C. while 10.5 grams (0.0347 mole) of 7-amino-1,3-naphthalenedisulfonic acid are slowly added. Upon completion of the addition, the mixture has a pH of 1.7, and a small amount of oily crystals has formed. The mixture is stirred at 0° C. for an additional two and one-half hours during which time a heavy precipitate of crystalline solid forms. The slurry is filtered, and the solid is washed with a small portion of methyl isobutyl ketone, with 60 ml. of iced water and with another small portion of methyl isobutyl ketone. After drying in vacuo over $P_2O_5$ the product, the 1:1 adduct of α-aminobenzylpenicillin and 7-amino-1,3-naphthalenedisulfonic acid, is found to weigh 14.2 grams and to have an activity of 500 micrograms of (—)-α-aminobenzylpenicillin per milligram.

EXAMPLE 9

*Part A: Preparation of starting materials*

(1) α-(2-thienyl)hydantoin. — Sodium cyanide (875 grams; 17.84 moles) and ammonium carbonate (4,050 grams; 41.8 moles) are dissolved in 12 liters of distilled water. To this solution there is added a solution of 1,000 grams (8.92 moles) of α-thiophenealdehyde in 12 liters of methanol. The addition and subsequent reaction are carried out under a blanket of nitrogen to prevent oxidation of the aldehyde. The mixture is heated to 50–55° C. with stirring for four hours, during which time it changes in color from white to deep yellow. The reaction mixture is cooled to room temperature and filtered, and the solid is washed with two one-liter portions of methanol.

The combined filtrate and washes are concentrated under reduced pressure to approximately one third their original volume. The pH of the solution is slowly adjusted to 2.0 with concentrated hydrochloric acid, taking the necessary precautions for disposal of the large amount of liberated HCN. The solution is heated to 95–100° C. for ten minutes and 200 grams of decolorizing carbon is added. The solution is heated for another five minutes and filtered. The carbon cake is washed with 500 ml. of water and the combined filtrate and wash is cooled in an ice bath for one hour to yield a light yellow crystalline precipitate, which is collected by filtration and washed with a small amount of water. The product, α-(2-thienyl)hydantoin, is found to weigh about 950 grams after drying.

(2) *DL - - amino - 2 - thienylacetic acid.* — α - (2-Thienyl)hydantoin (1,000 grams; 5.5 moles) is added to 4,000 ml. of 20% aqueous sodium hydroxide solution, and the mixture is refluxed for 17 hours. Fifty grams of decolorizing carbon is added, and the mixture is stirred for about five minutes. The hot reaction solution is filtered, and the filter cake is washed with one displacement of water. The combined filtrate and wash is cooled and slowly acidified with glacial acetic acid to a pH of 7.0. The resulting slurry is cooled to 15–20° C., filtered, and the filter cake is washed with one liter of cold water. The filter cake is suspended in two liters of distilled water and sufficient concentrated hydrochloric acid is added to dissolve the crude product (the resulting pH is approximately 1.0). A small amount of tarry material is found to be insoluble. Fifty grams of decolorizing carbon is added, the mixture is stirred for five minutes and filtered hot. The filter cake is washed with 200 ml. of water and the combined filtrate and wash is adjusted to pH 4.5 with $NH_4OH$ and chilled in an ice bath for one hour. The resulting slurry is filtered and washed with 250 ml. of iced water. The solid product, DL-α-amino-2-thienylacetic acid, is dried at 45–50° C.

(3) *(—)-α-Amino-2-thienylacetic acid.* d-10-camphorsulfonic acid (1620 grams; 7.0 moles) is dissolved in 9.7 liters of isopropanol at 60° C. This solution is heated to just below its boiling point and 1,000 grams (6.36 moles) of DL-α-amino-2-thienylacetic acid is added with stirring. The mixture is heated at the boiling point for a few minutes to obtain essentially complete solution and filtered hot through a heated filter. The filtered solution is stirred slowly and cooled to room temperature over a period of six hours. It is allowed to remain at room temperature for additional ten hours to complete the crystallization. The crystalline solid is recovered by filtration, washed with three liters of isopropanol and dried at 45–50° C. The product, the d-10-camphorsulfonic acid salt of (—)-α-amino-2-thienylacetic acid, is found to weigh 850 grams.

One thousand grams of the d-10-camphorsulfonic acid salt of α-amino-2-thienylacetic acid is slurried in three liters of distilled water and the pH of the slurry is adjusted to 5.5 by the slow addition of $NH_4OH$. After the pH has been adjusted to 5.5, an additional two liters of methanol is added to the slurry, and the slurry is stirred for an additional 20-minute period. The pH is readjusted as necessary to maintain it at 5.5. The slurry is cooled to 0° C. for one hour, filtered and the filter cake is washed with one liter of cold methanol-water solution (two parts methanol to one part water) and with three liters of methanol. The solid product, (—)-α-amino-2-thienylacetic acid is dried at 45–50° C. and is found to weigh about 330 grams. It melts with decomposition at 189–191° C. and has an optical rotation of $[\alpha]_D^{23} = -73.7°$ C. (concentration equals 1.0% in water).

(4) *(—)-α-Amino - 2 - thienylacetyl chloride hydrochloride.*—Dry hydrogen chloride gas is bubbled into a suspension of 17 grams (0.108 mole) of (—)-α-amino-2-thienylacetic acid in 200 ml. of methylene dichloride for a period of eight minutes at room temperature. The suspension is cooled to —10° C. with stirring and 29 grams (0.141 mole) of PCl₅ are added. Stirring is continued for three hours at a temperature of —8 to —5° C. and for an additional three hours at 0° to 2° C. The suspension is filtered and the solid material is washed with a small portion of methylene dichloride and dried in vacuo over P₂O₅. The product, (—)-α-amino-2-thienylacetyl chloride hydrochloride is found to weigh 21.2 grams.

*Part B: Preparation of (—)-α-amino-2-triethylmethylpenicillin*

6-aminopenicillanic acid (23.8 grams; 0.11 mole) is dissolved in 275 ml. of iced water by the addition of dilute NaOH to a pH of 7.2. To this solution (a total of 320 ml.) there is added 1,280 ml. of cold acetone. The solution is cooled to 0° C., and the pH is adjusted to 3.5 with hydrochloric acid. To the stirred solution there is added 21.2 grams (0.1 mole) of (—)-α-amino-2-thienylacetyl chloride hydrochloride over a period of twenty minutes. The pH is maintained between 2.5 and 3.0 during the reaction by the periodic addition of dilute NaOH. At the end of the twenty minute reaction time, the temperature has risen to 5° C. The pH is adjusted to 2.9, and stirring is continued for an additional fifteen minutes. Methyl isobutyl ketone (2,560 ml.) is added, and, after thorough mixing, the aqueous layer is separated. The methyl isobutyl ketone layer is extracted with a second 200 ml. portion of water and with a third 100 ml. portion of water. The combined aqueous layers are adjusted to pH 4.7, 250 ml. of methyl isobutyl ketone is added, and the mixture is concentrated under vacuum to approximately 350 ml., at which time a crystalline solid forms. The mixture is filtered, and the solid material is washed with small portions of water and methyl isobutyl ketone and dried in vacuo over P₂O₅. The resulting product, (—)-α-amino - 2 - thienylmethylpenicillin trihydrate, is found to weigh 10.7 grams and to inhibit the growth of *Staphylococcus aureus* Smith.

*Part C: Preparation of the adduct of (—)-α-amino-2-thienylmethylpenicillin and 7-amino-1,3-naphthalenedisulfonic acid*

The combined mother liquor and methyl isobutyl ketone washes from Part B, above, are cooled to 0° C., and there is added a solution of 30.0 grams (0.099 mole) of 7-amino-1,3-naphthalenedisulfonic acid in 200 ml. of water. The pH is adjusted from 3.7 to 2.4, whereupon crystallization begins. The pH is adjusted to 1.8 with concentrated HCl, and the resulting slurry is stirred for one hour in an ice bath and filtered. The solid material is washed with small portions of iced water and methyl isobutyl ketone, and dried in vacuo over P₂O₅. The product, the 1:1 molar adduct of (—)-α-amino-2-thienylmethylpenicillin and 7-amino-1,3-naphthalenedisulfonic acid, is found to weigh 14.5 grams.

EXAMPLE 10

*Part A.*—6-aminopenicillanic acid (47.6 grams, 0.22 mole) is dissolved in 640 ml. of iced water by the addition of dilute NaOH to a pH of 7.2. To this solution there is added 2.56 liters of cold acetone. The solution is cooled to 0° C., and the pH is adjusted to 3.5 by the addition of 45 ml. of concentrated HCl. The solution is stirred, and 61.0 grams (0.288 mole) of (—)-α-amino-2-thienylacetyl chloride hydrochloride (prepared according to the method of Example 9) is added over a period of twenty minutes, while maintaining the pH between 2.8 and 3.3. The reaction mixture is stirred for an additional twenty minutes and 6.4 liters of methyl isobutyl ketone are added. The aqueous layer is separated, and the methyl isobutyl ketone layer is extracted with two additional 200 ml. portions of water. The combined aqueous layers are adjusted to a pH of 4.7, 400 ml. of methyl isobutyl ketone is added, and the mixture is concentrated under vacuum until crystallization begins. The crystalline solid is removed by filtration, washed with small portions of iced water and methyl isobutyl ketone, and flashed to a semi-dry solid with Skellysolve B. After drying in vacuo over P₂O₅, the product, (—)-α-amino-2-thienylmethylpenicillin trihydrate is found to weigh 22.5 grams.

*Part B.*—The combined mother liquor and washes from Part A, above, are cooled to 0° C., and a solution of 45 grams (0.148 mole) of 7-amino-1,3-naphthalenedisulfonic acid in 300 ml. of water is added. The pH is adjusted to 1.6 and the resulting slurry is stirred for one hour. The crystalline solid is removed by filtration, washed with small portions of iced water and methyl isobutyl ketone, and dried in vacuo over P₂O₅. The product, the 1:1 molar adduct of (—)-α-amino-2-thienylmethylpenicillin and 7-amino-1,3-naphthalene-disulfonic acid, is found to weight 18.0 grams.

EXAMPLE 11

*Part A.*—(—)-α-Amino-2-thienylmethylpenicillin (3.0 grams; 0.0085 mole) is slurried in 50 milliliters of water, the slurry is cooled in an ice bath, and 30 milliliters of methyl isobutyl ketone are added. To this mixture there is slowly added a solution of 4.5 grams (0.015 mole) of 6-amino-1,3-naphthalenedisulfonic acid in 10 ml. of water. Crystallization begins immediately, and the pH is maintained at 1.7 during the addition of the final increments of the aminonaphthalenedisulfonic acid by the periodic addition of triethylamine. The resulting heavy slurry is stirred in an ice bath for two hours and the solid is removed by filtration, washed with small portions of iced water, methyl isobutyl ketone and Skellysolve B, and dried in vacuo over P₂O₅. The product, the 1:1 molar adduct of (—)-α-amino-2-thienylmethylpenicillin and 6-amino-1,3-naphthalenedisulfonic acid, is found to weigh 4.5 grams.

*Part B.*—The adduct obtained in Part A, above (4.5 grams) is slurried in a mixture of 50 milliliters of methyl isobutyl ketone, 10 milliliters of water and 7.5 milliliters of Liquid Amine No. 1 and stirred for four hours at room temperature. The solid product is removed by filtration, washed with a small portion of methyl isobutyl ketone, and dried in vacuo. The product, (—)-α-amino-2-thienylmethylpenicillin trihydrate, is found to weigh 2.96 grams, to contain 11.3% water as determined by Karl Fischer analysis and to have a bio-activity equivalent to 1,077 micrograms of (—)-α-aminobenzylpenicillin per milligram.

EXAMPLE 12

The procedure of Example 11, Part B is repeated using 15 milliliters of water and 15 milliliters of Liquid Amine No. 1. The product, (—)-α-amino-2-thienylmethylpenicillin trihydrate weighs 2.7 grams, contains 12.8% water as determined by Karl Fischer analysis and has a bio-activity equivalent to 1,040 micrograms of (—)-α-aminobenzylpenicillin per milligram.

We claim:

1. A member selected from the group consisting of compounds of the general formula $$R^2-CH-\overset{O}{\underset{\|}{C}}-NH-CH-CH\overset{S}{\underset{}{\diagdown}}\overset{CH_3}{\underset{}{\diagup}}C-CH_3$$
$$\underset{NH_2 \cdot R^1SO_3H}{\phantom{X}} \quad \underset{}{\overset{}{C}}-N-CH-COOH$$
$$\phantom{XXXXXXXXXXXX}\overset{\|}{O}$$

wherein R¹ is a member selected from the group consisting of

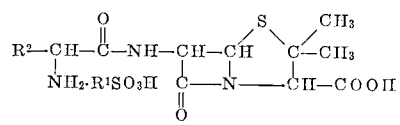
and
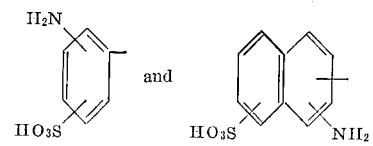

and wherein $R^2$ is a member selected from the group consisting of

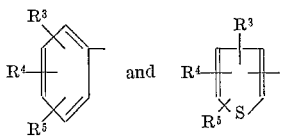

wherein $R^3$, $R^4$ and $R^5$ each represents a member selected from the group consisting of hydrogen, nitro, di(lower)alkylamino, (lower)alkanoylamino, (lower)alkanoyloxy, (lower)alkyl (including straight and branched chain saturated aliphatic groups having from 1 to 6 carbon atoms inclusive), (lower)alkoxy, sulfamyl, chloro, iodo, bromo, fluoro, trifluoromethyl, (lower)alkylthio, (lower)alkylsulfonyl, carbo(lower)alkoxy, benzyl, phenethyl, cycloheptyl, cyclohexyl and cyclopentyl.

2. The 1:1 molar adduct of an α-aminothienylmethylpenicillin and a compound selected from the group consisting of 2-amino-1,4-benzenedisulfonic acid, 7-amino-1,3-naphthalenedisulfonic acid, 6-amino-1,3-naphthalenedisulfonic acid, 3-amino-1,5-naphthalenedisulfonic acid, 8-amino-1,5-naphthalenedisulfonic acid, 3-amino-2,7-naphthalenedisulfonic acid, and 2-amino-1,5-naphthalenedisulfonic acid.

3. The 1:1 molar adduct of a compound of the formula

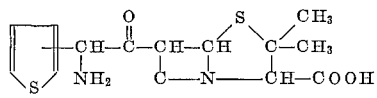

and an aminonaphthalenedisulfonic acid.

4. The 1.1 molar adduct of an α-aminobenzylpenicillin and a compound selected from the group consisting of 2-amino-1,4-benzenedisulfonic acid, 7-amino-1,3-naphthalenedisulfonic acid, 6 - amino-1,3-naphthalenedisulfonic acid, 3-amino-1,5-naphthalenedisulfonic acid, 8-amino-1,5-naphthalenedisulfonic acid, 3-amino-2,7-naphthalenedisulfonic acid, and 2-amino-1,5-naphthalenedisulfonic acid.

5. The 1:1 molar adduct of (—)-α-amino-2-thienylmethylpenicillin and an aminonaphthalenedisulfonic acid.

6. The 1:1 molar adduct of (—)-α-amino-2-thienylmethylpenicillin and 7-amino-1,3-naphthalenedisulfonic acid.

7. The 1:1 molar adduct of (—)-α-amino-2-thienylmethylpenicillin and 6-amino-1,3-naphthalenedisulfonic acid.

8. The 1:1 molar adduct of (—)-α-aminobenzylpenicillin and 7-amino-1,3-naphthalenedisulfonic acid.

9. The 1:1 molar adduct of (—)-α-aminobenzylpenicillin and 6-amino-1,3-naphthalenedisulfonic acid.

References Cited by the Examiner
UNITED STATES PATENTS

| | | | |
|---|---|---|---|
| 3,157,640 | 11/1964 | Johnson et al. | 260—239.1 |
| 3,180,862 | 4/1965 | Siluestri et al. | 260—239.1 |

References Cited by the Applicant
UNITED STATES PATENTS

| | | |
|---|---|---|
| 2,985,648 | 5/1961 | Doyle et al. |
| 3,080,356 | 3/1963 | Catlin et al. |
| 3,094,519 | 6/1963 | Luttinger et al. |
| 3,140,282 | 7/1964 | Johnson et al. |

OTHER REFERENCES

Aldrich Chemical Company, Inc., Catalog No. 11, pages 338–346 (1963).

Distillation Products Industries, "Eastman Organic Chemicals Classified by Functional Groups No. 2F," pages 53–55 (1963).

ALEX MAZEL, *Primary Examiner.*

JAMES W. ADAMS, JR., *Assistant Examiner.*